(12) United States Patent
Burkart et al.

(10) Patent No.: US 6,722,637 B2
(45) Date of Patent: Apr. 20, 2004

(54) FENCE POST ACCESSORY APPARATUS

(75) Inventors: Michael G. Burkart, Denver, CO (US); Jeffrey G. Herion, Watkins, CO (US)

(73) Assignee: Stallion Fence Accessories, Denver, CO (US)

( * ) Notice: Subject to any disclaimer, the term of this patent is extended or adjusted under 35 U.S.C. 154(b) by 0 days.

(21) Appl. No.: 09/974,101

(22) Filed: Oct. 10, 2001

(65) Prior Publication Data

US 2003/0066992 A1 Apr. 10, 2003

(51) Int. Cl.[7] .............................................. E04M 12/00
(52) U.S. Cl. .............................................. 256/1; 256/19
(58) Field of Search .............................. 256/19, 1, 59, 256/66

(56) References Cited

U.S. PATENT DOCUMENTS

| | | |
|---|---|---|
| 3,744,117 A * | 7/1973 | Heenan et al. ................ 29/416 |
| D255,472 S | 6/1980 | Gabriel |
| D309,788 S * | 8/1990 | Koziol ........................ D26/67 |
| 5,149,149 A | 9/1992 | Wu |
| 5,419,536 A | 5/1995 | Bender |
| 5,660,376 A | 8/1997 | West |
| 5,853,167 A | 12/1998 | West et al. |
| 5,971,365 A | 10/1999 | Pigott et al. |
| 6,076,807 A | 6/2000 | Spence |
| 6,135,623 A * | 10/2000 | Lin ............................. 362/431 |
| 2002/0072023 A1 * | 6/2002 | Shook ......................... 431/350 |
| 2002/0125468 A1 * | 9/2002 | Fischer ........................ 256/19 |
| 2002/0148183 A1 * | 10/2002 | Grant .......................... 52/300 |

OTHER PUBLICATIONS

"Stallion Fence Accessories" Brochure, Nov. 2000, 13 Pages.
Intermatic Malibu, "Sun–Powered Solar Accent Lighting" Brochure, Publication Unknown, 6 Pages.

* cited by examiner

Primary Examiner—John R. Cottingham
(74) Attorney, Agent, or Firm—Marsh Fischmann & Breyfogle LLP (57) ABSTRACT

A synthetic fence post assembly for realizing enhanced decorative capabilities of a synthetic fence. The assembly provides an apparatus for securely attaching accessories to the end of a synthetic fence post without structurally degrading the fence post. The apparatus comprises a connector member with a first and second interface surface one of which securely interfaces with the top of a synthetic post and the second of which is available to interface with various fencing accessories. In one embodiment, the connector member is substantially transparent, such that the connector forms a lens that is securely fastenable to a fence post and is capable of supporting a light mounted thereon.

23 Claims, 5 Drawing Sheets

FENCE POST ACCESSORY APPARATUS

FIELD OF THE INVENTION

The field of the invention relates generally to fencing, particularly synthetic fencing components constructed of synthetic materials such as plastic and vinyl. More specifically, the invention relates to an apparatus for attaching various components to the top of a hollow fence post.

BACKGROUND

Recently, there has been a tremendous increase in the use of synthetic fencing products. The popularity of synthetic fencing is due in part to its low maintenance; for example, vinyl fencing retains its color and need not be stained or otherwise treated every year to prevent decay. Additionally, synthetic fencing can take on the natural, attractive appearance of wood while exhibiting superior durability. Furthermore, since synthetic posts and their connecting members are hollow, electrical connections can be routed through the fence and hidden from view, allowing electrical accessories to be easily wired along the fence. Finally, synthetic fencing components are less expensive to mass-produce and easier to assemble than their wood counterparts.

Synthetic fencing does present several design challenges. For example, people often desire to mount various accessories on their fence posts such as rain gauges, bird feeders, lights, etc. Unlike a wooden post on which an accessory may be easily mounted using nails or screws, securely attaching accessories to a synthetic fence can be difficult as synthetic fence posts are typically hollow and lack the internal structure to support heavy objects attached to their side using conventional means such as nails or screws. Additionally, the use of nails or screws may cause structural damage to the fence post, possibly causing splitting or cracking. Another design challenge is to provide a means to securely attach decorative or functional accessories to the synthetic fence where the attachment means shares the aesthetic and durability qualities of the synthetic fence such that the appearance of the synthetic fence may be enhanced.

SUMMARY OF THE INVENTION

In view of the foregoing, it is the principal object of the present invention to provide an apparatus for realizing enhanced decorative capabilities with synthetic fencing.

It is a further object of the present invention to provide an apparatus for securely attaching accessories to a synthetic fence post without structurally degrading the fence post, which is aesthetically pleasing.

It is a further object of the present invention to provide a means to enhance the decorative appearance of a synthetic fence that is easily retrofit to the fence.

In accordance with the above objectives, the inventors have recognized that most synthetic fences contain a simple cap covering the open end of a hollow post and that by replacing this cap with attachments that are more decorative or styled a synthetic fence can take on an appearance more like that of a sculpted wooden fence. Accordingly, the inventors recognized the need to provide an apparatus that allows various sized accessories to interface with the synthetic fence posts while providing good structural support and not degrading the fence posts' integrity. Additionally, the inventors have recognized that the apparatus should be aesthetically pleasing to the eye, easy to manufacture, and should be made such that it may be retrofit onto an existing synthetic fence with minimal effort.

These and other objects are achieved by the present invention. In one embodiment, the present invention provides a synthetic fence post assembly comprising a connector member with two substantially parallel interface surfaces for placement on the end of a synthetic fence post and a top member for placement on the connector member. More particularly, the connector member is designed such that a first interface surface may engages the top end of a synthetic fence post and a second interface surface may engage the top member. Additionally, these interface surfaces contain engaging means for attaching the connector member to the interfacing structures (e.g., the post and top member). Once the connector member is attached to the fence post, a secure base is provided for mounting an accessory to the fence post without degrading the post's structural qualities.

The engaging means refer to one or more members that extend from the connector member across the interface plane as defined by the connector member and an interfacing structure. These members may extend perpendicular from the interface planes and be slidably received within their respective interfacing structure or slidably receive their respective interfacing structure. For example, the member(s) that make up the engaging means may comprise multiple tabs that fit within the hollow opening of an interfacing structure, such as a fence post, or may comprise a continuous wall that fits over and slidably receives the end of an interfacing structure. Additionally, the connector member may be configured such that both interface surfaces have the same engaging means or such that each interface surface contains a different engaging means.

The top member may be any attachment configured such that it interfaces with, and is supported by the connector member, such as a decorative cap (e.g., a ball, tetrahedron, etc.) or an accessory such as a lamp. In one embodiment, the top member has a hollow elongate body that, when used with the connector member, allows the synthetic fence to take on the appearance of a sculpted wooden fence. In another embodiment, the top member comprises a housing for a lamp that contains apertures along its body that allow light to pass from within the structure upon assembly. In this embodiment, the apertures may be left open or covered with translucent caps that may diffuse the light as it passes from within the top member while sealing the top member from the elements.

The use of a hollow top member (e.g., an elongate tube) with the connector member will generally require using a cap to seal the top member's second end from the elements. This cap may be anything configured to interface with and seal the top member from the elements, such as, for example, the simple caps that were originally on the synthetic fence posts. Additionally, the cap may itself be a decorative or functional accessory. For example, in one embodiment the cap may be a solar light apparatus comprising a solar panel oriented on top its top, a battery operable to receive an electrical charge from the solar panel, and a light connected to the battery on the bottom of the cap such that the light is enclosed within the top member upon assembly. As will be appreciated, when using a solar cap assembly, a light may be retrofit onto an existing synthetic post using the connector member and apertured top member of the present invention without having to perform any electrical wiring through the synthetic fencing.

In another embodiment, the present invention provides a synthetic fence post assembly comprising: a connector member comprising two substantially parallel interface surfaces for placement on the end of a synthetic fence post, an exterior sidewall and an interior sidewall disposed between the interface surfaces that collectively define an opening, an internal support mount connected to the internal sidewall within the opening, and a top member for placement on the connecting member.

The connector member's internal support mount may be connected to the interior sidewall using a plurality of interconnecting members that extend from the interior sidewall to the edge of the support mount. The support mount will generally be configured such that it forms an enclosure for receiving and holding an accessory in axial alignment with the center of the post. For example, the support mount may be formed as a ring where the ring's internal edge is open to receive/hold an accessory with a circular base. However, other configurations of the support mount are possible, such as, for example, a pin that is slidably receivable within an accessory. As will be appreciated, use of the internal support in conjunction with the connector member allows the synthetic fence post to support an accessory with a significant weight, since the post will carry the entire weight of an accessory so mounted in compression across its cross section. Additionally, this arrangement allows for supporting an accessory without any degradation of the fence post's structural integrity caused by mechanical fasteners such as nails and screws applying a force to a concentrated point on the post's sidewall.

In another embodiment, a fence post assembly is provided comprising a substantially transparent connector member and a top member for placement on the substantially transparent connector member. The translucent connector member comprises two substantially parallel interface surfaces each of which contain engaging means for engaging an interfacing structure, one of these engaging means may be designed to interface with the end of a fence post. The transparent connector further comprises an interior and exterior sidewall disposed between the interface surfaces that integrally define an opening which is axially aligned with the fence post. As will be appreciated, this sidewall area may provide an enclosed space within the transparent connector member for placement of an accessory such as a light. In this regard, the connector member forms a lens having one engaging means for interfacing with the end of a fence post and another engaging means for interfacing with a lamp. The transparent connector member also comprises a diffusing means on the surface of at least one of the interior and exterior sidewall. This diffusing means may be any coating or physical variation on the sidewall surfaces which act to disperse light that may emanate from within the transparent connector member. In one embodiment using a physical variation of the sidewall surface, the diffusing means comprises a plurality of ridges integrally formed on the interior surface. These ridges may be continuously spaced on the surface and may be oriented perpendicular to said first and second interface surfaces. In this regard, the ridges may be easily formed in, for example, an injection molding process.

In all aspects of the present invention, the connector member may be formed in a variety of geometric shapes as long as it provides a first interface surface for engaging the synthetic post and a second interface surface for engaging a top member. For aesthetic purposes the connector member will typically share the geometry of the fence post (e.g., square post, square connector); however, the connector member may be formed such that it interfaces a post and top member of different cross sectional geometries (e.g., square to circular etc.) and/or diameters.

A method is also provided in accordance with the present invention for attaching an accessory to a synthetic fence post. The method includes the steps: defining an opening on the end of a fence post, providing a connector member with two interface surfaces that contain engaging means, positioning the connector member on the fence post such that the engaging means engage the post, placing an accessory on the connecting member such that the engaging means engage the accessory, and securing the engaging means to the post and accessory using a fastening means.

Additional aspects advantages of the present invention will become apparent upon consideration of the further description that follows.

DETAILED DESCRIPTION

Figure 1:
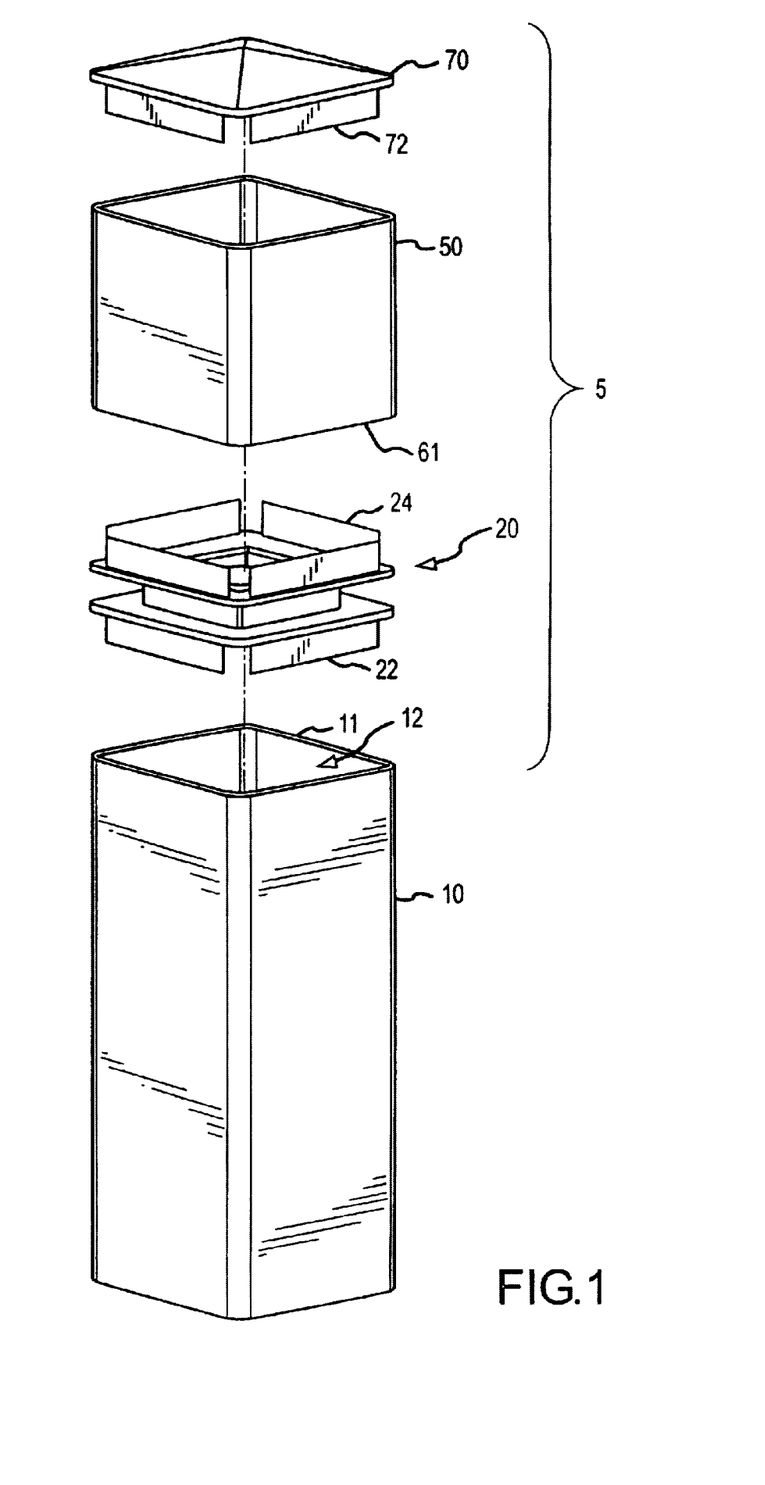
FIG. 1 shows an exploded perspective view of the synthetic fence post assembly as oriented atop a synthetic fence post.

Referring to FIG. 1, there is shown an exploded perspective view of one embodiment of the present invention. As shown, a synthetic fence post assembly 5 is placed on the upper end of a synthetic fence post 10, allowing a homeowner to add a decorative accessory to their synthetic fence posts such that these fence posts look more like sculpted wooden posts with a notch engraved about their circumference. In the illustrated embodiment, the synthetic fence post 10 is hollow such that the upper end forms a cavity 12. The connector member 20 interfaces with the hollow end of the synthetic fence post 10 using a plurality of downward-facing tabs 22 arranged about the connector member's lower peripheral edge and oriented such that they are perpendicular to the interface plane between the post 10 and the connector member 20. These downward-facing tabs 22, only two of which are shown in FIG. 1, are disposed such that they are slidably receivable within the fence post cavity 12. Typically, the tabs 22 will be constructed such that they nest securely within the cavity 12 and thereby prevent undesired lateral movement of the connector member 20 and provide some resistance to removal. To further secure the connector member 20, the engaged tabs may be affixed to the interior post wall using an adhesive or, if removal of the connector is required in the future, a mechanical means such as a screw.

The top member 50 of the synthetic fence post assembly 5 interfaces with the connector member 20 and is supported thereby. In FIG. 1 the top member 50 is shown with a hollow elongate body. This top member may be made of the same material as the synthetic fence post and contain the same geometric cross-section. The top member 50 is connected to the connector member 20 using upward-facing tabs 24 on the connector member's upward peripheral edge. These upward-facing tabs 24 are again disposed such that they are perpendicular to the interface plane between the connector member and the top member and are slidably receivable within the top member 50. Last, a cap 70 is placed atop the top member 50 to seal the assembly from moisture and debris. In the illustrated embodiment, the cap 70 contains downward-facing tabs 72 that slidably fit within the top member 50.

Figure 2:
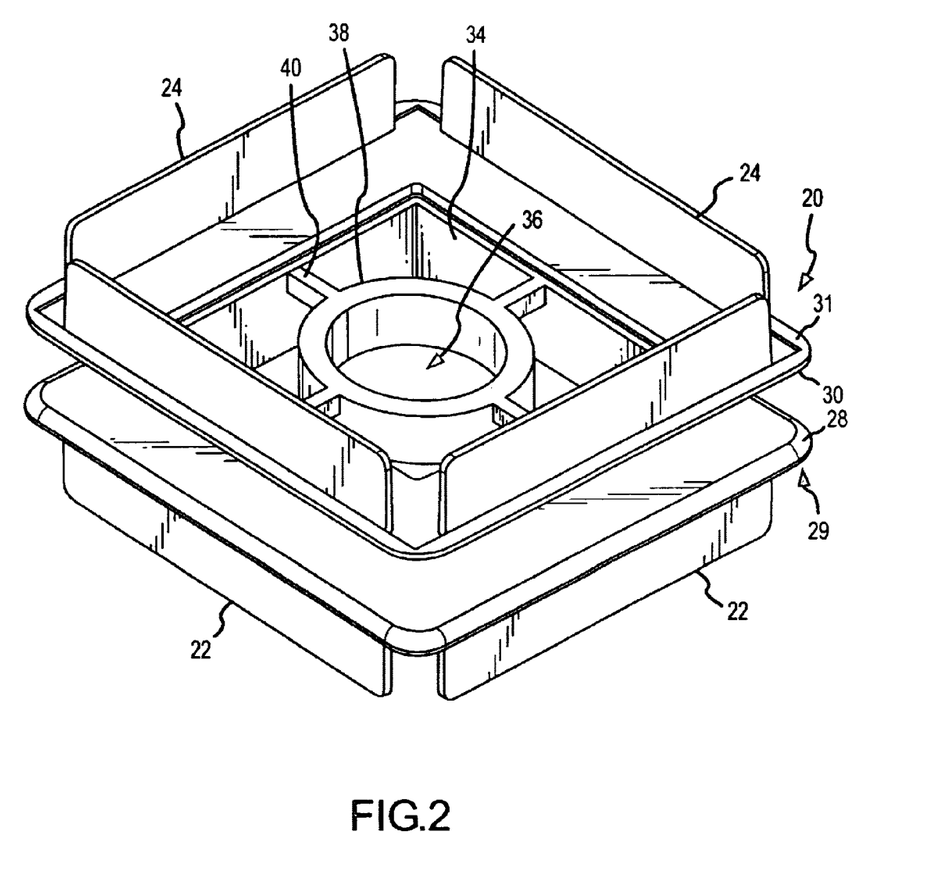
FIG. 2 shows a perspective view of the connector member and its internal support mount.
Figure 3:
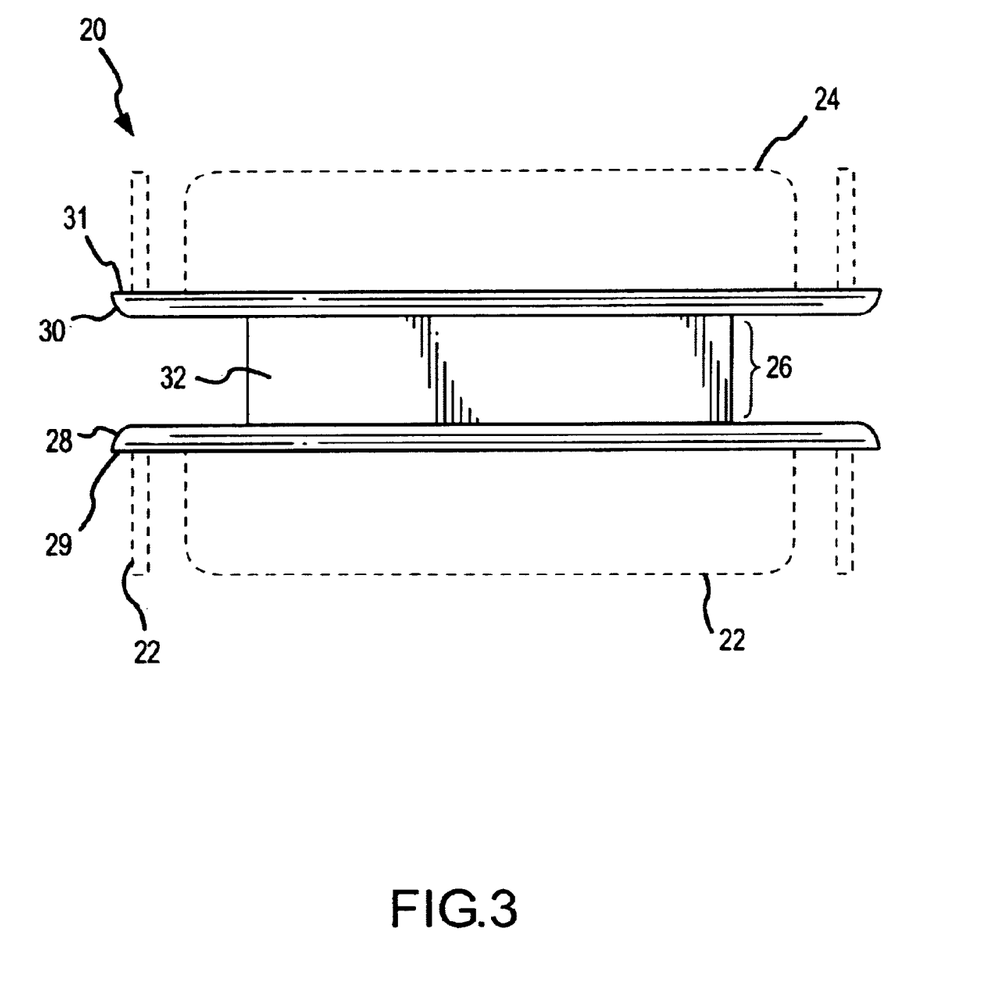
FIG. 3 shows a plan side view of the connector member.

FIGS. 2 and 3, show a perspective and side view of the connector member 20 respectively. As shown, the connector member 20 contains a recessed main body 26, a lower shoulder 28 with a lower interface surface 29, an upper shoulder 30 with an upper interface surface 31, a plurality of downward-facing tabs 22 and a plurality of upward-facing tabs 24. More particularly, the main body 26, located between the interface surfaces 29 and 31, comprises an exterior sidewall 32 as shown in FIG. 3 and an interior sidewall 34 as shown in FIG. 2. The exterior sidewall 32 and interior sidewall 34 form an opening 36 that, in the illustrated embodiment of FIG. 1, shares the same basic geometry as the end of the synthetic fence post 10. This opening 36 is axially aligned with the synthetic fence post cavity 12 when the connector member 20 is interfaced with the synthetic fence post 10. Contained within the opening 36 is a support mount 38 for axially aligning and supporting accessories on and/or within the fence post 10. The support mount 38 is connected to the interior sidewall 34 by a plurality of interconnecting members 40. The interconnecting members 40 are shown disposed in an opposing relationship with one another but may be arranged in any fashion that effectively supports the support mount 38. As shown, support mount 38 comprises a ring with an open center for receiving and supporting accessories; however, this mount 38 may be made of any geometrical shape that will fit inside the opening 36 and provide an attachment surface for an accessory. For example, if an accessory had an octagonal base, the support mount may be formed accordingly to support this geometry.

The connector shoulder members 28 and 30 each contain a smooth interface surface 29 and 31 on which their respective interfacing structures rest. The upper interface surface 31 supports the top member's lower sidewall 61 (see FIG. 1), while the lower interface surface 29 rests atop the fence post sidewall 11. As shown, interface surfaces 29 and 31 are oriented such that the interface planes defined by each are parallel. As will be appreciated this ensures that an accessory mounted to the fence will be squarely aligned with the end of the fence post. Additionally, the connector shoulder members 28 and 30 are sized such that they match the outside perimeter of their respective interface structures upon assembly. For example, as shown in the side view of FIG. 3, the bottom shoulder 28 and interface surface 29 extend a short distance beyond the downward-extending tab 22. This distance is equal to the sidewall thickness of the synthetic fence post 10 such that when the connector member 20 is placed on top of the synthetic fence post 10 the downward-facing tabs 22 will fit inside the fence post cavity 12 and the shoulder 28 will extend to match the peripheral edge of the synthetic fence post. The top shoulder 30 interfaces in a similar manner with accessories attached thereto.

Connector member 20 and post 10 are shown in the illustrations with a square cross-sectional shape; however, it will be understood that other shapes may be utilized depending on aesthetic preferences. For example, the connector member may be configured such that the lower shoulder 28 interfaces with a post with a square cross-section while the upper shoulder supports a top member with a round cross-section, or vice-versa. Additionally, the connector member 20 may be sized such that it connects a post of one diameter to an accessory of a second diameter. For example, synthetic posts typically come in diameters of four and five inches and various accessories exist for either of these sizes. However, an accessory for a five-inch fence post will not generally fit a four-inch post. Therefore, the connector member may be sized such that the bottom interface surface fits a post of a first size and the top interface surface supports an accessory of a second size, thus increasing the amount of options for homeowners in decorating their fences.

Generally, the connector member 20 will be made of a plastic material such as polyvinyl chloride (PVC) or other suitable plastic material such that it shares the durability and aesthetic qualities of the synthetic fence. Additionally, for structural integrity the support member 38 connecting members 40 and the interior sidewall 34 may be an integrally formed unit.

Figure 4:
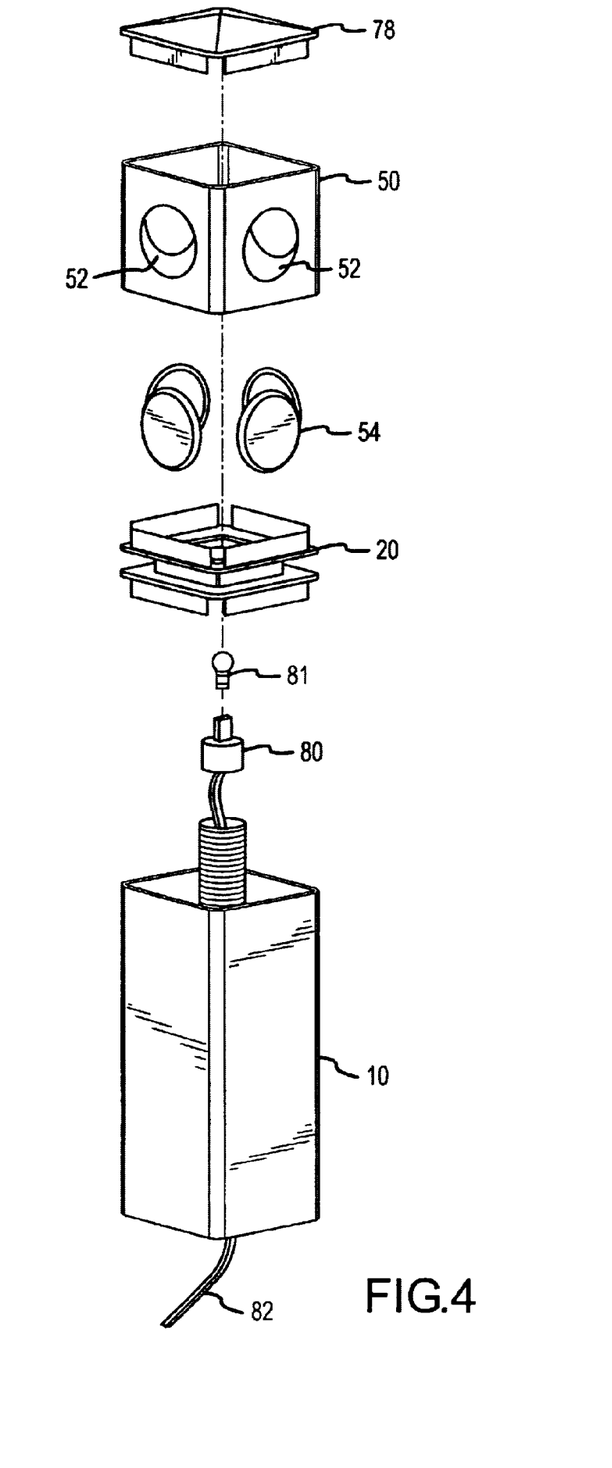
FIG. 4 shows an exploded perspective view of the synthetic fence post assembly incorporating a light fixture.

FIG. 4 shows an exploded perspective view of another embodiment of the present invention. In this embodiment, hollow top member 50 further comprises a plurality of apertures 52 about its elongate body to allow light to pass from within. Translucent lenses 54 may be attached to these apertures 52 to seal the top member 50 from the elements and diffuse the light as it passes through. Further, a light assembly 80, supported by the support mount (not shown), extends into the top member 50 upon assembly such that the light bulb 81 is nearly level with the apertures 52. As will be appreciated, the embodiment of FIG. 4 allows for an enclosed light assembly to be mounted on the end of a synthetic fence post 10 wherein all wiring 82 may be routed through the post and thus, hidden from view. If desired, the connector member 20, the top member 50, and the cap member 70 may be made of the same material and color as the fence post 20, providing an aesthetically pleasing light assembly that is easily retrofit onto an existing synthetic fence.

Figure 5:
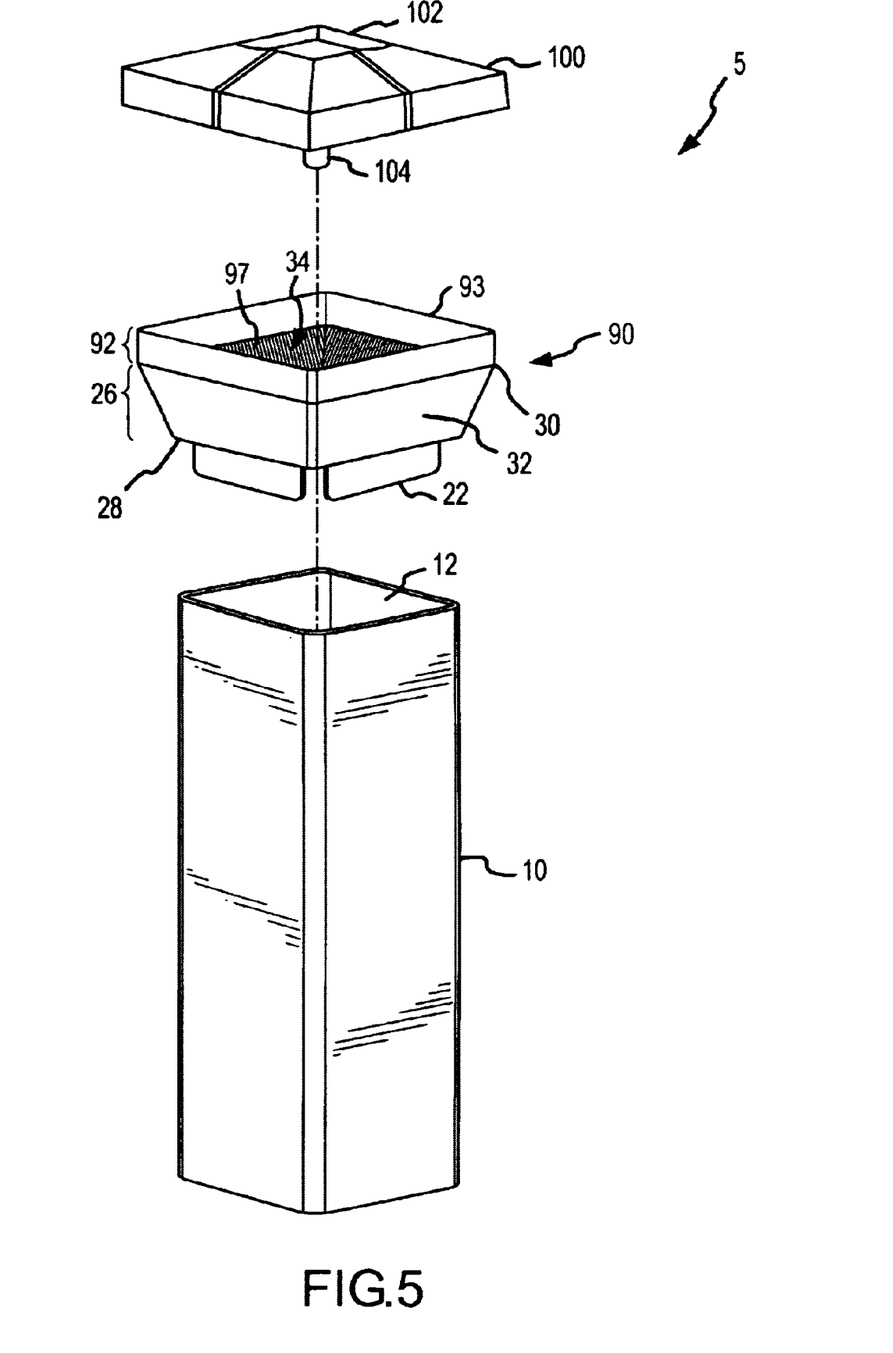
FIG. 5 shows a perspective view of a translucent connector member with a solar light cap top assembly.

FIG. 5 shows an exploded perspective view of another embodiment of the present invention. In this embodiment, a differently configured connector member 90 is shown that may be used to interconnect the synthetic fence post 10 and a top member 50. In this embodiment, the connector member 90 is substantially transparent such that light may pass from within the member. In this regard, the connector member 90 forms, in effect, a lens for placement/mounting on the end of a post where the lens is also capable of supporting a light mounted thereon. Again, the connector member 90 contains downward extending tabs 22 that are disposed such that they are slidably received within the post cavity 12. However, the main body 26 is not recessed in relation to the upper and lower shoulders 30 and 28. Additionally, in place of upward facing tabs for engaging a top member or accessory, connector member 90 has a continuous upward-facing side wall 92 connected around the periphery of the upper shoulder 30 which fits over the outside perimeter of a top member. Alternatively, the upward-facing sidewall 92 may be slidably received within a top member 50 such that the top member 50 rests on the upper edge 93 of the upward facing side wall 92. In this configuration, the top member 50 may be attached to the upward-facing sidewall 92 using an adhesive or mechanical fastener. In this embodiment, the connector member 90 again contains an exterior sidewall 32 and an interior sidewall 34 which integrally define an enclosure. However, in this embodiment, the interior sidewall 32 contains a plurality of continuously spaced ridges 97 oriented perpendicular to the interface plane formed by the connector member 90 and the fence post 10 upon assembly. As shown, the ridges 97 extend between the lower shoulder 28 and the upper shoulder 30. These ridges are designed to diffuse any light emanating from within the assembly 5. FIG. 5 also shows a solar voltaic cap 100 as the top member 50. The solar voltaic cap member 100 comprises a solar collector 102 that is mounted on top of the cap 100, a battery (not shown) in electrical communication with and charged by the solar collector, and a light 104. The light may be configured such that it only operates at night using energy stored by the battery during the daylight hours. As will be appreciated, if the solar voltaic cap member is used with a translucent connector member 90, a lighting assembly is provided that may be retrofit onto a synthetic fence without the requirement of any wiring. In addition, the translucent connector's 90 downward facing engaging means may be configured with a continuous downward facing wall that is operative to fit over and slidably receive the end of a fence post. In this regard, this connector member 90 may be retrofit onto existing wooden fence posts that lack an internal cavity to slidably receive an attachment means such as tabs.

In accordance with the above apparatus, a method is provided for connecting an accessory to the end of a synthetic fence post using a dual interface connector member. In particular, the method requires defining an opening on the end of an existing synthetic fence post. As will be appreciated, this is typically a simple process, as most synthetic fence posts are hollow and the existing caps may be pried off; however, in some instances, this may entail cutting the synthetic post's sidewall about its circumference such that the existing cap may be removed. Next, a dual interface connector member containing engaging means on each interface is provided.

The connector member is positioned atop the synthetic fence post such that the engaging means are properly aligned with the post. For example, in the case where tabs are used, the end of the tabs must be oriented inside the post sidewall. Once the engaging means is properly aligned, pressure is applied such that the engaging means seat with the fence post. Once the connector member is securely interfaced with the fence post (i.e., flushly mounted), an accessory may be placed on the connector member's second interface surface such that the second engaging means are properly aligned with the accessory. Again, force is applied to set the engaging means with the accessory. Additionally, in the case of an electrical accessory, the step of placing may further entail routing wires through the connector member and into the hollow of the post so they are hidden from view.

Once both interface surfaces are flushly mounted with their respective interfacing structures, they may be secured thereto using a fastening means. Generally, an adhesive or mechanical means will be used to secure the connector member to the interfacing structures. As will be appreciated, if further access is required to within the accessory, a removable mechanical fastener such as a screw is preferable.

The embodiment described above is for exemplary purposes only and is not intended to limit the scope of the present invention. Various adaptations, modifications and extensions of the described assembly will be apparent to those skilled in the art and are intended to be within the scope of the invention as defined by the claims which follow.

What is claimed:

1. A fence post apparatus comprising:
a fence post;
a connector member for placement on a top end of said fence post comprising a hollow body with a top end and a bottom end, wherein the hollow body includes sidewalls extending between said stop and bottom ends to define an enclosed space, and wherein said sidewalls permit the passage of light therethrough and and include a light diffusing means for dispersing light emanating from within the hollow body; and
a top member having a first end for engaging said top end of the hollow hotly of said connector member.

2. The apparatus of claim 1, wherein said connector member is a single piece, and wherein said light diffusing means comprises a plurality of ridges integrally formed on at least one of an interior surface and exterior surface or said sidewalls.

3. The apparatus of claim 2, wherein said plurality of ridges are continuously spaced on and across the lateral extent of said at least one surface of said sidewalls.

4. The apparatus of claim 3, wherein said ridges are oriented perpendicular to said top and bottom ends of the hollow body.

5. The apparatus of claim 4, wherein said ridges extend substantially the length of the hollow body between said top and bottom ends.

6. The apparatus of claim 1, further comprising:
first engaging means provided at said top end of the said hollow body, for engaged said top member; and,
second engaging means provided at said bottom end of said hollow body for engaging a top end of said fence post.

7. The apparatus of claim 1, wherein said first engaging means and said second engaging means are slidably engaging with said top member and a top end of said fence post, respectively.

8. The apparatus of claim 7, wherein at least one of said first and second engaging means comprises multiple tabs, and wherein said tabs are receivable within corresponding one of said top member and a top end of said fence post.

9. The apparatus of claim 7, wherein at least one of said first and second engaging means comprises a continuous sidewall portion, and wherein said sidewall portion is sized to receive corresponding one of said top member and a top end of said fence post.

10. The apparatus of claim 1, wherein said light diffusing means comprises at least one of a physical variation of and a coating on said sidewalls of the hollow body.

11. The apparatus of claim 1, further comprising:
a solar collector;
an energy storage device electrically interconnected to the solar collector; and,
a light positioned within said connector member and electrically connected to the energy storage device.

12. The apparatus of claim 11, wherein said solar collector is mounted within an opening at a top end of the top member.

13. The apparatus of claim 1, wherein said connector is a single piece.

14. The apparatus of claim 1, wherein said sidewalls include a plurality of apertures, and wherein said diffusing means includes a corresponding plurality of translucent lens located in said plurality of apertures.

15. A fence post assembly comprising:
a fence post
a single piece connector member for placement on an end of said fence post and comprising:
a hallow body with a top end and a bottom end, wherein said hollow body extends between said top and bottom ends to define an enclosed space and permits the passage of light therethrough, including a light diffusing means;
first engaging means provided at said top end of said hollow body;
second engaging means provided at said bottom end of said hollow body for engaging a top end of said fence post; and a top member adapted to engage said first engaging means of said connector member.

16. The assembly of claim 15, wherein said hollow body comprises substantially transparent sidewalls.

17. The assembly of claim 15, wherein sidewalls of the hollow body comprises, said light diffusing means for dispersing light emanating from within said hollow body.

18. The assembly of claim 17, wherein said light diffusing means comprises at least one of a coating and a physical variation on said at least one of an inside surface and outside surfaces of said sidewalls of said hollow body.

19. The assembly of claim 17, wherein said top member further comprises:

a light supportably positioned within said hollow body.

20. The assembly of claim 19, wherein said top member further comprises:

a solar collector supportably mounted within an opening at a top end of the top member; and, a rechargeable battery electrically connected to both the solar collector and the light.

21. The assembly of claim 16, wherein said first engaging means and said second engaging means are slidably engageable with said top member and said top end of said fence post, respectively.

22. The assembly of claim 21, wherein at least one of said first and second engaging means comprises multiple labs, and wherein said tabs are receivable within a corresponding one of said top member and said top end of said fence post.

23. The assembly of claim 21, wherein at least one of said first and second engaging means comprise a continuous sidewall portion, and wherein said sidewall portion is sized to receive a corresponding one of said top member and said top end of said fence post.

* * * * *

UNITED STATES PATENT AND TRADEMARK OFFICE
CERTIFICATE OF CORRECTION

PATENT NO. : 6,722,637 B2
DATED : April 20, 2004
INVENTOR(S) : Burkart et al.

It is certified that error appears in the above-identified patent and that said Letters Patent is hereby corrected as shown below:

Column 7,
Line 65, delete the word "stop", and insert therefor -- top --.
Line 67, delete the second occurrence of the word "and".

Column 8,
Line 4, delete the word "hotly", and insert therefor -- body --.
Line 8, delete the word "or", and insert therefor -- of --.
Line 20, delete the word "the".
Line 31, after the word "within", insert -- a --.
Line 36, after the word "receive", insert -- a --.
Line 56, after the word "post", insert -- ; --.
Line 59, delete the word "hallow", and insert therefor -- hollow --.

Column 9,
Line 6, delete the word "comprises,", and insert -- comprise: --.
Line 11, delete the word "surfaces", and insert therefor -- surface --.

Column 10,
Line 8, delete the word "labs", and insert therefor -- tabs --.

Signed and Sealed this

Thirty-first Day of August, 2004

JON W. DUDAS
*Director of the United States Patent and Trademark Office*

UNITED STATES PATENT AND TRADEMARK OFFICE
CERTIFICATE OF CORRECTION

PATENT NO. : 6,722,637 B2
DATED : April 20, 2004
INVENTOR(S) : Burkart et al.

It is certified that error appears in the above-identified patent and that said Letters Patent is hereby corrected as shown below:

Column 3,
Line 4, after "define", insert -- : --.

Column 6,
Line 61, delete "sidewall 32", and insert therefor -- sidewall 34 --.

Column 8,
Line 21, delete "engaged", and insert therefor -- engaging --.
Line 25, delete "1", and insert therefore -- 6 --.
Line 49, after "connector", insert -- member --.

Column 9,
Line 10, after "and", insert -- an --.

Signed and Sealed this

Twenty-sixth Day of October, 2004

JON W. DUDAS
*Director of the United States Patent and Trademark Office*

ико

(12) EX PARTE REEXAMINATION CERTIFICATE (9243rd)
United States Patent
Burkart et al.

(10) Number: US 6,722,637 C1
(45) Certificate Issued: Aug. 28, 2012

(54) FENCE POST ACCESSORY APPARATUS (75) Inventors: Michael G. Burkart, Denver, CO (US); Jeffrey G. Herion, Watkins, CO (US)

(73) Assignee: LMT-Mercer Group, Inc., Lawrenceville, NJ (US)

Reexamination Request:
No. 90/011,555, Mar. 9, 2011

Reexamination Certificate for:
Patent No.: 6,722,637
Issued: Apr. 20, 2004
Appl. No.: 09/974,101
Filed: Oct. 10, 2001

Certificate of Correction issued Aug. 31, 2004.

Certificate of Correction issued Oct. 26, 2004.

(51) Int. Cl.
*E04H 17/20* (2006.01)
*E04H 17/14* (2006.01)
*E04H 17/00* (2006.01)

(52) U.S. Cl. ............................................. 256/1; 256/19

(58) Field of Classification Search .................... 362/152
See application file for complete search history.

(56) References Cited

To view the complete listing of prior art documents cited during the proceeding for Reexamination Control Number 90/011,555, please refer to the USPTO's public Patent Application Information Retrieval (PAIR) system under the Display References tab.

*Primary Examiner* — Cary Wehner (57) ABSTRACT

A synthetic fence post assembly for realizing enhanced decorative capabilities of a synthetic fence. The assembly provides an apparatus for securely attaching accessories to the end of a synthetic fence post without structurally degrading the fence post. The apparatus comprises a connector member with a first and second interface surface one of which securely interfaces with the top of a synthetic post and the second of which is available to interface with various fencing accessories. In one embodiment, the connector member is substantially transparent, such that the connector forms a lens that is securely fastenable to a fence post and is capable of supporting a light mounted thereon.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 6-8, 17 and 19 are cancelled.

Claims 1, 9, 11, 15, 18, 20 and 21 are determined to be patentable as amended.

Claims 2-5, 10, 12-14, 16, 22 and 23, dependent on an amended claim, are determined to be patentable.

1. A fence post apparatus comprising:
a fence post; a connector member for placement on a top end of said fence post *and* comprising a hollow body with a top end and a bottom end, wherein the hollow body includes sidewalls extending between said top and bottom ends to define an enclosed space, and wherein said sidewalls permit the passage of light therethrough and include a light diffusing means for dispersing light emanating from within the hollow body; [and]
a top member having a first end for engaging said top end of the hollow body of said connector member; *a first engaging means provided at said top end of said hollow body for engaging said top member; and second engaging means provided at said bottom end of said hollow body for engaging a top end of said fence post, wherein said first engaging means and said second engaging means are axially slidably engaging with said top member and a top end of said fence post respectively, said second engaging means is dimensioned to provide resistance to removal, and at least one of said first and second engaging means comprises multiple tabs, and wherein said tabs are receivable within a corresponding one of said top member and a top end of said fence post.*

9. The apparatus of claim [7] *1*, wherein at least one of said first and second engaging means comprises a continuous sidewall portion, and wherein said sidewall portion is sized to receive a corresponding one of said top member and a top end of said fence post.

11. [The apparatus of claim 1, further comprising:] *A fence post apparatus comprising:*
a fence post;
a connector member for placement on a top end of said fence post and comprising a hollow body with a top end and a bottom end, wherein the hollow body includes sidewalls extending between said top and bottom ends to define an enclosed space, and wherein said sidewalls permit the passage of light therethrough and include a light diffusing means for dispersing light emanating from within the hollow body; engaging means provided at said bottom end of said hollow body for axially slidably engaging the top end of said fence post and dimensioned to provide resistance to removal; a top member having a first end for engaging said top end of the hollow body of said connector member;
a solar collector;
an energy storage device electrically interconnected to the solar collector; and[.]
a light positioned within said connector member and electrically connected to the energy storage device.

15. A fence post assembly comprising:
a fence post;
a single piece connector member for placement on an end of said fence post and comprising:
a hollow body with a top end a bottom end, wherein said hollow body extends between said top and bottom ends to define an enclosed space and permits the passage of light therethrough, [including a light diffusing means] *wherein sidewalls of the hollow body comprise light diffusing means for dispersing light emanating from within said hollow body*;
first engaging means provided at said top end of said hollow body;
second engaging means provided at said bottom end of said hollow body for *axially slidably* engaging a top end of said fence post *and dimensioned to provide resistance to removal*; and
a top member adapted to engage said first engaging means of said connector member, *wherein said top member comprises a light supportably positioned within said hollow body*.

18. The assembly of claim [7]*15*, wherein said light diffusing means comprises at least one of a coating and a physical variation on said at least one of an inside surface and an outside surface of said sidewalls of said hollow body.

20. The assembly of claim [9]*15*, wherein said top member further comprises:
a solar collector supportably mounted within an opening at a top end of the top member; and[.]
a rechargeable battery electrically connected to both the solar collector and the light.

21. The assembly of claim 16, wherein said first engaging means [and said second engaging means are] *is axially* slidably engageable with said top member [and said top end of said fence post, respectively].

\* \* \* \* \*